(12) United States Patent
Zhang et al.

(10) Patent No.: US 11,772,326 B2
(45) Date of Patent: Oct. 3, 2023

(54) PARTITIONED LIFTING FORMING TYPE SELECTIVE LASER MELTING WORKBENCH

(71) Applicant: Chongqing University, Chongqing (CN)

(72) Inventors: Zhengwen Zhang, Chongqing (CN); Peng Zhang, Chongqing (CN); Kaifei Zhang, Chongqng (CN); Zhonghua Li, Chongqing (CN); Zhongfa Mao, Chongqing (CN); Jingwei Dai, Chongqing (CN)

(73) Assignee: CHONGQING UNIVERSITY, Chongqing (CN)

( * ) Notice: Subject to any disclaimer, the term of this patent is extended or adjusted under 35 U.S.C. 154(b) by 419 days.

(21) Appl. No.: 16/634,314

(22) PCT Filed: Oct. 27, 2017

(86) PCT No.: PCT/CN2017/108084
§ 371 (c)(1),
(2) Date: Mar. 4, 2020

(87) PCT Pub. No.: WO2019/029022
PCT Pub. Date: Feb. 14, 2019

(65) Prior Publication Data
US 2020/0324339 A1     Oct. 15, 2020

(30) Foreign Application Priority Data

Aug. 8, 2017    (CN) ..................... 2017106699093.2

(51) Int. Cl.
*B29C 67/00*     (2017.01)
*B29C 64/153*    (2017.01)
(Continued)

(52) U.S. Cl.
CPC ............ *B29C 64/153* (2017.08); *B22F 10/28* (2021.01); *B22F 10/30* (2021.01); *B22F 12/22* (2021.01);
(Continued)

(58) Field of Classification Search
CPC ........ B22F 10/20; B22F 10/30; B29C 64/153; B29C 64/227; B33Y 10/00; B33Y 30/00; B33Y 50/00; B33Y 50/02
See application file for complete search history.

(56) References Cited

U.S. PATENT DOCUMENTS

| | | |
|---|---|---|
| 2017/0129011 A1 | 5/2017 | Murata et al. |
| 2018/0194126 A1 | 7/2018 | Hagedorn et al. |
| 2021/0283856 A1* | 9/2021 | Chen ...................... B29C 64/40 |

FOREIGN PATENT DOCUMENTS

| | | |
|---|---|---|
| CN | 105014071 A | 11/2015 |
| CN | 105459401 A | 4/2016 |

(Continued)

OTHER PUBLICATIONS

Written Opinion of the International Searching Authority (translation) for PCT/CN2017/108084 (Year: 2018).*

(Continued)

*Primary Examiner* — Ryan M Ochylski
(74) *Attorney, Agent, or Firm* — Harness, Dickey & Pierce, PLC; Anthony G. Fussner

(57) ABSTRACT

A partitioned lifting forming type selective laser melting workbench, comprises at least forming platform (1) for powder-spreading and sintering and forming of workpiece, the forming platform (1) comprises forming inner abutment (1-1) and at least one forming outer abutment (1-2) which is sleeved on the forming inner abutment (1-1) and arranged in sequence from the inside to the outside in a radial direction, the forming inner abutment (1-1) and each forming outer (Continued)

abutment (1-2) are arranged in a manner of rise and fall, the forming inner abutment (1-1) or the forming outer abutment (1-2) falls independently, or the forming outer abutment (1-2) and the adjacent forming outer abutment or/and the forming inner abutment (1-1) fall together, it can form an area (2) to be subjected to powder-spreading for laser sintering and forming of workpiece.

20 Claims, 2 Drawing Sheets

(51) Int. Cl.
*B22F 10/30* (2021.01)
*B22F 10/28* (2021.01)
*B22F 12/00* (2021.01)
*B22F 12/30* (2021.01)
*B22F 12/90* (2021.01)
*B33Y 30/00* (2015.01)
*B33Y 50/02* (2015.01)
*B29C 64/227* (2017.01)

(52) U.S. Cl.
CPC .............. *B22F 12/30* (2021.01); *B22F 12/90* (2021.01); *B29C 64/227* (2017.08); *B33Y 30/00* (2014.12); *B33Y 50/02* (2014.12)

(56) References Cited

FOREIGN PATENT DOCUMENTS

| | | |
|---|---|---|
| CN | 205165874 U | 4/2016 |
| CN | 106457395 A | 2/2017 |
| CN | 206065415 | 4/2017 |
| CN | 107262717 A | 10/2017 |
| DE | 102015109848 A1 | 12/2016 |

OTHER PUBLICATIONS

PCT International Search Report (and its English translation) and Written Opinion for PCT Application No. PCT/CN2017/108084 filed Oct. 27, 2017, dated May 4, 2018, 10 pages.

* cited by examiner

PARTITIONED LIFTING FORMING TYPE SELECTIVE LASER MELTING WORKBENCH

This patent application is a U.S. national stage filing under 35 U.S.C. § 371 of International Application No. PCT/CN2017/108084 filed Oct. 27, 2017 (published as WO 2019/029022 on Feb. 14, 2019) which claims the benefit of and priority to Chinese application number 201710669903.2 filed Aug. 8, 2017. The disclosures of the applications identified in this paragraph are incorporated herein by reference in their entirety.

TECHNICAL FIELD

The present invention relates to a technical field of selective laser melting, and in particular, to a partitioned lifting forming type selective laser melting workbench.

BACKGROUND

Selective laser melting, also known as SLM, is a technology in which metal powder is completely melted under the action of heat of laser beam and formed by cooling and solidifying. Under the action of high laser energy density, the metal powder is completely melted, and after heat dissipation and cooling, it can be formed with solid metal metallurgy by welding. Selective laser melting goes through this process and forms three-dimensional solids by layer accumulation. According to the layered slice information of the three-dimensional CAD model of the forming part, the scanning system controls the laser beam to act on the powder in the area to be formed, after the scanning of one layer is completed, the work platform will fall the distance of a layer thickness and the powder feeding system will deliver a certain amount of powder, and the roller of the powder spreading system will spread the powder of a layer thickness deposited on the formed layer. Then, repeat the above two forming processes until all slice layers of all three-dimensional CAD models are scanned.

In the prior art, the workbench for selective laser melting device used for laser sintering and forming of workpieces is mostly an integrated structure, spreading powder is carried out through the overall falling of the integrated structure workbench, and the workpiece is sintered and formed, however, based on the characteristics of the layer-by-layer process of selective laser melting, on an integrated lifting forming workbench, regardless of the size of the thin-walled part being formed, the powder must eventually fill the entire falling height of the forming workbench. Therefore, it is necessary to use a large amount of powder during the process for sintering and forming of workpieces, although the powder can be recycled, it also causes a large amount of powder containing soot, which not only reduces the quality of the powder and the powder cost is large, but also the laser system is extremely sensitive to dust, if the dust level is too high, it will easily cause greater damage.

Therefore, it is necessary to improve the existing selective laser melting workbench so that it can select the forming work area by partitioned area and reduce the amount of powder used to reduce the input cost of powder and to reduce the generation of soot according to the size of the processed parts.

SUMMARY

In light of this, the present invention provides a partitioned lifting forming type selective laser melting workbench, it can select the forming work area by partitioned area and reduce the amount of powder used to reduce the input cost of powder and to reduce the generation of soot according to the size of the processed parts.

The partitioned lifting forming type selective laser melting workbench of the present invention at least comprises a forming platform for powder-spreading and sintering and forming of workpiece, the forming platform comprises a forming inner abutment and at least one forming outer abutment which is sleeved on the forming inner abutment and arranged in sequence from the inside to the outside in a radial direction, the forming inner abutment and each forming outer abutment are arranged in a manner of rise and fall, the forming inner abutment or the forming outer abutment falls independently, or the forming outer abutment and the adjacent forming outer abutment or/and the forming inner abutment fall together, it can form an area to be subjected to powder-spreading for laser sintering and forming of workpiece.

Further, it further comprises a powder supplying platform arranged on the outside of at least one side of the forming platform along the powder spreading direction and used for powder supplying, the powder supplying platform comprises powder supplying inner abutment and at least one powder supplying outer abutment which is sleeved on the powder supplying inner abutment and arranged in sequence from the inside to the outside in a radial direction, the powder supplying inner abutment and each powder supplying outer abutment are arranged in a manner of rise and fall, the powder supplying inner abutment or the powder supplying outer abutment rises independently, or the powder supplying outer abutment and the adjacent powder supplying outer abutment or/and the powder supplying inner abutment rise together, it can form a powder supplying area corresponding to the area to be subjected to powder-spreading.

Further, the forming inner abutment and the powder supplying inner abutment are the same one of a cylinder, a triangular prism, a cube or a cuboid, each forming outer abutment and each powder supplying outer abutment is a hollow structure corresponding to the shape of the forming inner abutment and powder supplying inner abutment respectively.

Further, the bottoms of the forming inner abutment and each forming outer abutment and the powder supplying inner abutment and each powder supplying outer abutment are respectively provided with at least one driving device for driving their respective rise and fall.

Further, the number of the powder supplying platform is two, they are arranged on two sides of the forming platform along the powder spreading direction.

Further, it further comprises a control system and the control system comprises:

an input unit for inputting dimensional data of the model of the workpiece to be formed;

a control unit, which is connected to the input unit for receiving user input signals, judging and determining the area to be subjected to powder-spreading and the powder supplying area based on the input signals, and controlling the operation the driving device corresponding to the area to be subjected to powder-spreading and the powder supplying area which are already determined.

Further, the driving device is a hydraulic cylinder, the control system further comprises a group of hydraulic drive system controlled by the control unit and corresponding to each hydraulic cylinder, each hydraulic drive system comprises:

a digital amplifier connected to the control unit and used for converting the motion parameter data transmitted from the control unit into an analog signal for output;

a proportional reversing valve connected to the digital amplifier and used for receiving analog signals to control the movement direction of hydraulic cylinder and hydraulic oil flow;

a displacement sensor provided on the hydraulic cylinder for detecting displacement information of a piston rod, and a signal output terminal of the displacement sensor is connected to a signal input terminal of the digital amplifier.

The advantageous effects of the present invention are: the partitioned lifting forming type selective laser melting workbench of the present invention, both the forming inner abutment and the forming outer abutment of the forming platform can be liftable structure, due to the forming outer abutment is sleeved on the outside of the forming inner abutment and is at least one arranged in sequence from the inside to the outside in a radial direction, in this way, the entire forming platform (i.e. the forming inner abutment and all forming outer abutments) can form an entire forming processing platform together. When the part is a special part (such as a ring-shaped part, etc.), the forming inner abutment can fall independently, or a single forming outer abutment can fall independently, or the forming outer abutment and the adjacent forming outer abutment or/and the forming inner abutment can fall together according to the model size of the part to be formed, it can form a area to be subjected to powder-spreading for making part forming. Because the area to be subjected to powder-spreading is caused by falling, in the process of spreading powder, the powder only fall into the area to be subjected to powder-spreading under the action of a scraper, forming a partitioned lifting forming workbench structure, in this way, the non-processing area of the entire forming platform except the area to be subjected to powder-spreading is no longer completely covered with powder, thereby greatly reducing the demand for powder, improving the use efficiency of the powder, and reducing dust generation in the forming chamber of the laser melting device.

DRAWINGS

Hereinafter, the present invention is further described in conjunction with drawings and embodiments:

DETAILED DESCRIPTION

Figure 1:
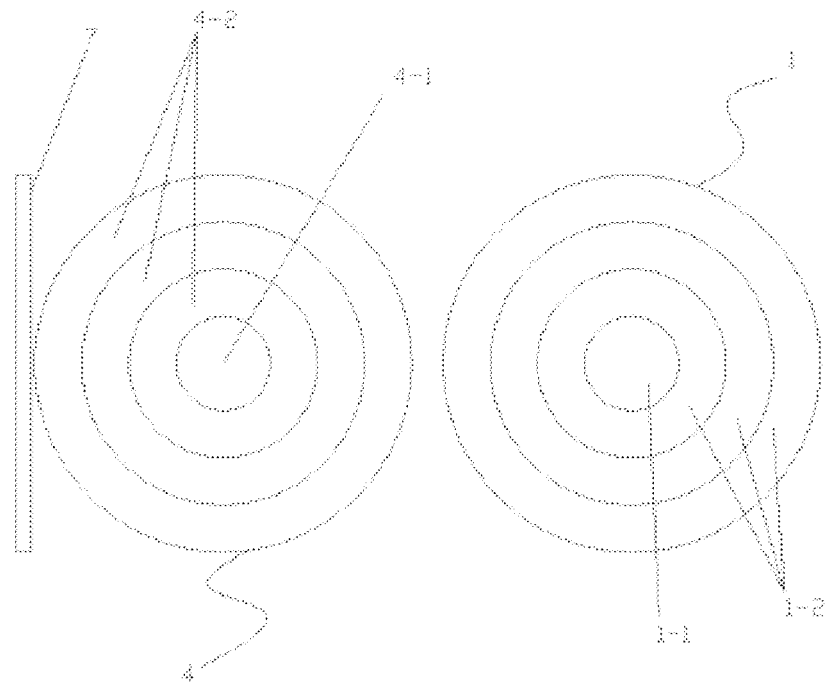
FIG. 1 is a top view of the entire structure of the present invention.
Figure 2:
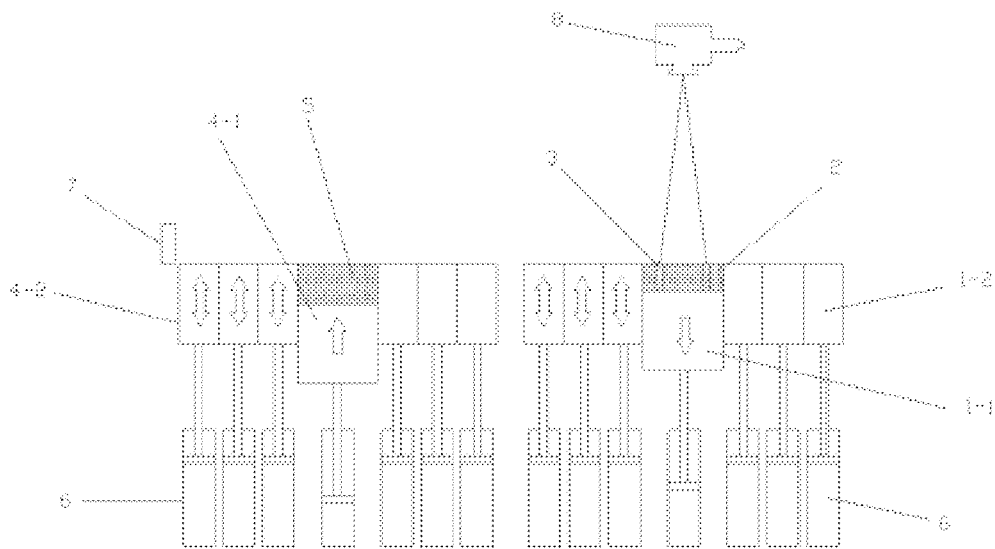
FIG. 2 is a schematic view of the working state of the present invention when forming a small-sized thin-walled part.
Figure 3:
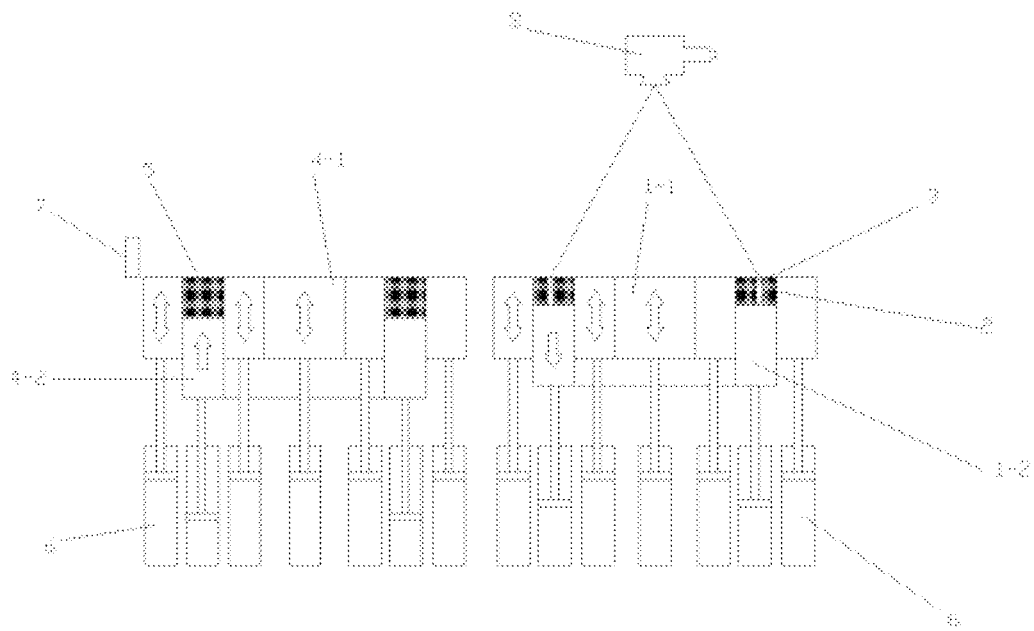
FIG. 3 is a schematic view of the working state of the present invention when forming a big-sized thin-walled part.
Figure 4:
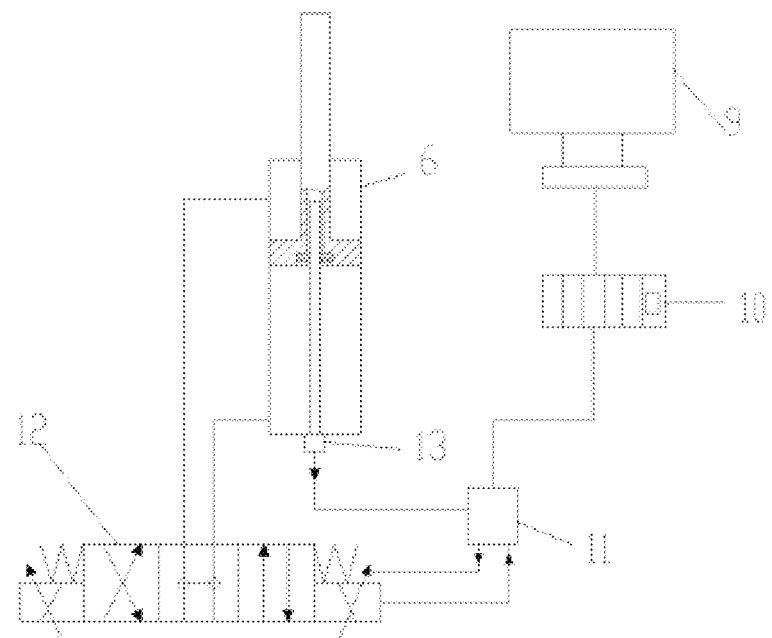
FIG. 4 shows the control principle view of the hydraulic drive system.

FIG. 1 is a top view of the entire structure of the present invention; FIG. 2 is a schematic view of the working state of the present invention when forming a small-sized thin-walled part; FIG. 3 is a schematic view of the working state of the present invention when forming a big-sized thin-walled part. As shown in the figures: the partitioned lifting forming type selective laser melting workbench of this embodiment at least comprises a forming platform 1 for powder-spreading and sintering and forming of workpiece, the forming platform 1 comprises a forming inner abutment 1-1 and at least one forming outer abutment 1-2 which is sleeved on the forming inner abutment and arranged in sequence from the inside to the outside in a radial direction, the forming inner abutment 1-1 and each forming outer abutment 1-2 are arranged in a liftable manner, the forming inner abutment 1-1 or the forming outer abutment 1-2 falls independently, or the forming outer abutment 1-2 and the adjacent forming outer abutment 1-2 or/and the forming inner abutment 1-1 fall together, it can form an area 2 to be subjected to powder-spreading for laser sintering and forming of workpiece. The workbench of this embodiment can be used for solid parts, and can also be used for thin-walled parts with hollow interiors, wherein, the forming inner abutment 1-1 and the forming outer abutment 1-2 are sequentially sleeved in the radial direction, forming a multiple structure from the inside to the outside in the radial direction. And the innermost forming outer abutment 1-2 and the inner forming abutment 1-1 are closely arranged, and the adjacent outer forming abutments 1-2 are closely arranged, in this embodiment, three outer forming abutments 1-2 are provided, and of course, it can be one, two or more than three, besides, the forming inner abutment 1-1 and each of the forming outer abutment 1-2 are arranged to be lifted up and down. When it is used for solid parts, the inner abutment can fall together with the adjacent forming outer abutment 1-2 to form the area 2 to be subjected to powder-spreading, or the forming platform 1 falls overall to form the area 2 to be subjected to powder-spreading. When it is used for ring-shaped thin-walled parts with hollow interiors for sintering and forming, according to the size of the model of part 3 to be formed, the forming inner abutment 1-1 can fall independently to form the powder-spreading area, or each forming outer abutment 1-2 can fall independently to form the area 2 to be subjected to powder-spreading. When the formed part model is large and the thin-wall is thick, two or more adjacent forming outer platforms 1-2 can fall together to form the area 2 to be subjected to powder-spreading. Of course, when the overall size of the formed part model is small but the thin wall is thick, the forming inner abutment 1-1 and its adjacent forming outer abutment 1-2 can fall together to form the area 2 to be subjected to powder-spreading. In short, the falling area is selected from the forming inner abutment 1-1 and the forming outer abutment 1-2 according to actual demand.

In this embodiment, it further comprises a powder supplying platform 4 arranged on the outside of at least one side of the forming platform 1 along the powder spreading direction and used for powder supplying, the powder supplying platform 4 comprises a powder supplying inner abutment 4-1 and at least one powder supplying outer abutment 4-2 which is sleeved on the powder supplying inner abutment and arranged in sequence from the inside to the outside in a radial direction, the powder supplying inner abutment 4-1 and each powder supplying outer abutment 4-2 are arranged in a liftable manner, the powder supplying inner abutment 4-1 or the powder supplying outer abutment 4-2 rises independently, or the powder supplying outer abutment 4-2 and the adjacent powder supplying outer abutment 4-2 or/and the powder supplying inner abutment 4-1 rise together, it can form a powder supplying area 5 corresponding to the area 2 to be subjected to powder-spreading. Similar to the principle of the forming platform 1, the powder supplying inner abutment 4-1 and the powder supplying outer abutments 4-2 can also form a multiple structure sequentially sleeved and arranged in the radial direction. And the innermost powder supplying outer abutment 4-2 and the powder supplying inner abutment 4-1 are closely arranged, and the adjacent powder supplying outer abutments 4-2 are closely arranged, and the powder supplying inner abutment 4-1 and the powder supplying outer abutments 4-2 are arranged to be lifted up and down. Wherein, in this embodiment, three powder supplying outer abutments 4-2 are provided, and of course, it can be one, two or more than three. Also, according to the size of the model of the part to be processed, the powder supplying inner abutment 4-1 and the powder supplying outer abutments 4-2 rise selectively to form powder supplying area 5 with different sizes suitable for different sizes, and in the actual processing process, the powder supplying area 5 and the area 2 to be subjected to powder-spreading form a one-to-one correspondence relationship.

In this embodiment, the forming inner abutment 1-1 and the powder supplying inner abutment 4-1 are the same one of a cylinder, a triangular prism, a cube or a cuboid, each forming outer abutment 1-2 and each powder supplying outer abutment 4-2 is a hollow structure corresponding to the shape of the forming inner abutment 1-1 and powder supplying inner abutment 4-1 respectively. In this embodiment, both the forming inner abutment 1-1 and the powder supplying inner abutment 4-1 are solid cylindrical structures, wherein the diameter of the forming inner abutment 1-1 is smaller than or equal to the diameter of the powder supplying inner abutment 4-1, both the forming outer abutment 1-2 and the powder supplying outer abutment 4-2 are ring-shaped hollow structures, the lifting up and down of the forming inner abutment 1-1 and the powder supplying inner abutment 4-1 and the forming outer abutment 1-2 and the powder supplying outer abutment 4-2 are guided by the adjacent abutment.

In this embodiment, the bottoms of the forming inner abutment 1-1 and each forming outer abutment 1-2 and the powder supplying inner abutment 4-1 and each powder supplying outer abutment 4-2 are respectively provided with at least one driving device 6 for driving their respective lifting and down. The driving device 6 is an extension hydraulic cylinder, and one extension hydraulic cylinder is provided for each of the forming inner abutment 1-1 and the powder supplying inner abutment 4-1, corresponding to each forming outer abutment 1-2 and powder supplying outer abutment 4-2, there are provided two extension hydraulic cylinders which are symmetrical in radial.

In this embodiment, the number of the powder supplying platform 4 is two, they are arranged on two sides of the forming platform 1 along the powder spreading direction, it is convenient to use the scraper 7 on two sides to scrape the powder into the area 2 to be subjected to powder-spreading.

In this embodiment, it further comprises a control system and the control system comprises:
input unit 9 for inputting dimensional data of the model of the workpiece to be formed; the input unit 9 may be an industrial computer or other input device for receiving user input data;
a control unit 10, which is connected to the input unit 9 for receiving user input signals, judging and determining the area 2 to be subjected to powder-spreading and the powder supplying area 5 based on the input signals, and controlling the operation of the driving device 6 corresponding to the area 2 to be subjected to powder-spreading and the powder supplying area 5 which are determined; the control unit is a programmable controller, usually a single-chip microcomputer, the control unit receives the user's input data and converts it into the motion parameters of the corresponding driving device, the specific conversion process is realized by the prior art, and the improvement of this part is not involved here.

In this embodiment, the driving device is a hydraulic cylinder, the control system further comprises a group of hydraulic drive system controlled by the control unit and corresponding to each hydraulic cylinder, each hydraulic drive system comprises:
digital amplifier 11 connected to the control unit and used for converting the motion parameter data transmitted from the control unit into an analog signal and then outputting the same;
proportional reversing valve 12 connected to the digital amplifier and used for receiving analog signals to control the movement direction of hydraulic cylinder and hydraulic oil flow;
a displacement sensor 13 provided on the hydraulic cylinder for detecting displacement information of a piston rod, and a signal output terminal of the displacement sensor is connected to a signal input terminal of the digital amplifier;
wherein, each hydraulic drive system comprises the digital amplifier, the displacement sensor and the proportional reversing valve, the digital amplifier is an integrated structure, each hydraulic drive system is data-connected to the control unit through its own digital amplifier, the input unit 9 issues an instruction based on the model data input by the user, the control unit transmits the motion parameters that control each hydraulic drive system to the digital amplifier corresponding to the hydraulic drive system after data processing, the digital amplifier performs data conversion on the received motion parameter data, and sends the corresponding analog signal to the proportional reversing valve, the proportional directional valve controls the direction and hydraulic oil flow of the hydraulic cylinder, the displacement sensor feeds back the position information of the piston rod to a digital amplifier to form a closed-loop control.

Take the processing of circular ring-shaped thin-walled parts as an example, the working principle of the workbench of the present invention will be described: the workbench is a multiple circular ring-shaped lifting workbench, powder supplying platform 4 can add powder, the forming platform 1 forms parts under the action of the laser galvanometer 8, during the process, the powder supplying platform 4 moves upward to supply powder, the forming platform 1 falls by a layer thickness, the scraper 7 spreads the powder from the powder supplying platform 4 to the forming platform 1, lifting and falling of forming platform 1 and powder supplying platform 4 are driven by hydraulic cylinder, workbench movement guidance relies on the cooperation between circular ring abutments.

When processing circular thin-walled parts of different sizes, the laser galvanometer 8 system can scan the entire range of the forming platform 1 from the forming inner abutment 1-1 to the outermost forming outer abutment 1-2. When the shape and size of the circular ring-shaped thin-walled part is within the range of the forming inner abutment 1-1, before processing, the hydraulic cylinder set corresponding to the powder supplying inner abutment 4-1 of powder supplying platform 4 drives the powder supplying inner abutment 4-1 to fall and add powder, after the processing starts, the area of the powder supplying inner abutment 4-1 rises to supply powder, the forming inner abutment 1-1 falls by a layer thickness by the driving of its corresponding hydraulic cylinder, the scraper 7 moves to spread the powder in the area of the powder supplying inner abutment 4-1 into the area of the forming inner abutment 1-1, the laser galvanometer 8 system irradiates selectivity for sintering powder, after sintering one layer, the scraper 7 resets and continues to scrape powder, this process is repeated to form a thin-walled solid body. When the shape and size of the thin-walled part is within the range of one forming outer abutment 1-2 of the forming platform 1, before processing, the powder supplying outer abutment 4-2 of powder supplying platform 4 corresponding to the position of the area of the forming outer abutment 1-2 falls and adds powder, after the processing starts, area of the powder supplying outer abutment 4-2 that has been fallen rises to supply powder, the forming outer abutment 1-2 synchronously falls by a layer thickness, the scraper 7 moves to spread the powder in the area of the powder supplying outer abutment 4-2 into the falling area of the forming outer abutment 1-2, the laser galvanometer 8 system irradiates selectivity for sintering powder, after sintering one layer, the scraper 7 resets and continues to scrape powder, this process is repeated to form a thin-walled solid body. Similarly, the principle of forming a workpiece on the area of the remaining forming outer abutment 1-2, and forming outer abutment 1-2 and the adjacent forming outer abutment 1-2 or/and the forming inner abutment 1-1 is the same as above.

According to the size of the thin-walled part to be formed, lifting powder supplying platform 4 by partitioned area and lifting forming platform 1 by partitioned area according to the partitioned lifting forming type selective laser melting workbench of the present invention, which can form parts 3 to be formed suitable for different sizes, thereby greatly reducing the demand for powder, improving the use efficiency of the powder.

Finally, it is to be explained that, the above embodiments are only used to explain the technical solutions of the present invention, but not to limit the present invention. Although the present invention is explained in detail with reference to preferred embodiments, those ordinary skilled in the art should understand that, without departing from the gist and the scope of the technical solutions of the present invention, modifications or equivalent substitutions may be made to the technical solutions of the present invention, which are to be covered by the scope of the claims of the present invention.

The invention claimed is:

1. A partitioned lifting forming type selective laser melting workbench, comprising a forming platform for powder-spreading and sintering and forming of a workpiece, the forming platform comprises a forming inner abutment and at least one forming outer abutment which is sleeved on the forming inner abutment and arranged in sequence from the inside to the outside in a radial direction such that the forming inner abutment and each forming outer abutment form an entire forming processing platform together, the forming inner abutment and each forming outer abutment are arranged in a manner of rise and fall selectively to form different partitioned areas to be subjected to powder-spreading for laser sintering and forming of the workpiece, whereby the forming inner abutment or the forming outer abutment falls independently to thereby selectively form a first partitioned area, which is less than the entire forming processing platform, to be subjected to powder-spreading for laser sintering and forming of the workpiece according to a first model size of a first part to be formed, whereby the forming outer abutment and the adjacent forming outer abutment and/or the forming inner abutment fall together to thereby selectively form a second partitioned area, which is less than the entire forming processing platform and different than the first partitioned area, to be subjected to powder-spreading for laser sintering and forming of the workpiece according to a second model size of a second part to be formed, wherein the forming inner abutment and each forming outer abutment are cylindrical.

2. The partitioned lifting forming type selective laser melting workbench according to claim 1, further comprising a powder supplying platform arranged on the outside of at least one side of the forming platform along the powder spreading direction and usable for powder supplying, the powder supplying platform comprises a powder supplying inner abutment and at least one powder supplying outer abutment which is sleeved on the powder supplying inner abutment and arranged in sequence from the inside to the outside in a radial direction, the powder supplying inner abutment and each powder supplying outer abutment are arranged in a manner of rise and fall selectively to form powder supplying areas of different sizes, whereby the powder supplying inner abutment or the powder supplying outer abutment rises independently, or the powder supplying outer abutment and the adjacent powder supplying outer abutment and/or the powder supplying inner abutment rise together, and thereby selectively form a first or second powder supplying area corresponding to the respective first or second partitioned area to be subjected to powder-spreading such that a non-processing area of the entire forming processing platform, except for the first or second partitioned area, is not subjected to powder spreader.

3. The partitioned lifting forming type selective laser melting workbench according to claim 2, wherein:
   each of the forming inner abutment and the powder supplying inner abutment is a solid cylindrical structure; and
   each forming outer abutment and each powder supplying outer abutment is a ring-shaped hollow structure corresponding to the cylinder shape of the forming inner abutment and the powder supplying inner abutment respectively.

4. The partitioned lifting forming type selective laser melting workbench according to claim 3, wherein the bottoms of the forming inner abutment and each forming outer abutment and the powder supplying inner abutment and each powder supplying outer abutment are respectively provided with at least one driving device for driving their respective rise and fall.

5. The partitioned lifting forming type selective laser melting workbench according to claim 1, wherein:
   the number of the powder supplying platform is two; and
   the two powder supplying platforms are arranged on two sides of the forming platform along the powder spreading direction.

6. The partitioned lifting forming type selective laser melting workbench according to claim 2, wherein:
   the number of the powder supplying platform is two; and
   the two powder supplying platforms are arranged on two sides of the forming platform along the powder spreading direction.

7. The partitioned lifting forming type selective laser melting workbench according to claim 3, wherein:
   the number of the powder supplying platform is two; and
   the two powder supplying platforms are arranged on two sides of the forming platform along the powder spreading direction.

8. The partitioned lifting forming type selective laser melting workbench according to claim 4, wherein:
   the number of the powder supplying platform is two; and the two powder supplying platforms are arranged on two sides of the forming platform along the powder spreading direction.

9. The partitioned lifting forming type selective laser melting workbench according to claim 5, further comprising a control system that comprises:
   an input unit for inputting dimensional data of the model of the workpiece to be formed;
   a control unit connected to the input unit for receiving user input signals, judging and determining the area to be subjected to powder-spreading and the powder supplying area based on the input signals, and controlling the operation the driving device corresponding to the area to be subjected to powder-spreading and the powder supplying area which are already determined.

10. The partitioned lifting forming type selective laser melting workbench according to claim 6, further comprising a control system that comprises:
    an input unit for inputting dimensional data of the model of the workpiece to be formed;
    a control unit connected to the input unit for receiving user input signals, judging and determining the area to be subjected to powder-spreading and the powder supplying area based on the input signals, and controlling the operation the driving device corresponding to the area to be subjected to powder-spreading and the powder supplying area which are already determined.

11. The partitioned lifting forming type selective laser melting workbench according to claim 7, further comprising a control system that comprises:
    an input unit for inputting dimensional data of the model of the workpiece to be formed;
    a control unit connected to the input unit for receiving user input signals, judging and determining the area to be subjected to powder-spreading and the powder supplying area based on the input signals, and controlling the operation the driving device corresponding to the area to be subjected to powder-spreading and the powder supplying area which are already determined.

12. He partitioned lifting forming type selective laser melting workbench according to claim 8, further comprising a control system that comprises:
    an input unit for inputting dimensional data of the model of the workpiece to be formed;
    a control unit connected to the input unit for receiving user input signals, judging and determining the area to be subjected to powder-spreading and the powder supplying area based on the input signals, and controlling the operation the driving device corresponding to the area to be subjected to powder-spreading and the powder supplying area which are already determined.

13. The partitioned lifting forming type selective laser melting workbench according to claim 9, wherein:
    the driving device is a hydraulic cylinder;
    the control system further comprises a group of hydraulic drive systems controlled by the control unit and corresponding to each hydraulic cylinder; and
    each hydraulic drive system comprises:
      a digital amplifier connected to the control unit and usable for converting the motion parameter data transmitted from the control unit into an analog signal for output;
      a proportional reversing valve connected to the digital amplifier and usable for receiving analog signals to control the movement direction of hydraulic cylinder and hydraulic oil flow; and
      a displacement sensor provided on the hydraulic cylinder for detecting displacement information of a piston rod, and a signal output terminal of the displacement sensor is connected to a signal input terminal of the digital amplifier.

14. The partitioned lifting forming type selective laser melting workbench according to claim 10, wherein:
    the driving device is a hydraulic cylinder;
    the control system further comprises a group of hydraulic drive systems controlled by the control unit and corresponding to each hydraulic cylinder; and
    each hydraulic drive system comprises:
      a digital amplifier connected to the control unit and usable for converting the motion parameter data transmitted from the control unit into an analog signal for output;
      a proportional reversing valve connected to the digital amplifier and usable for receiving analog signals to control the movement direction of hydraulic cylinder and hydraulic oil flow; and
      a displacement sensor provided on the hydraulic cylinder for detecting displacement information of a piston rod, and a signal output terminal of the displacement sensor is connected to a signal input terminal of the digital amplifier.

15. The partitioned lifting forming type selective laser melting workbench according to claim 11, wherein:
    the driving device is a hydraulic cylinder;
    the control system further comprises a group of hydraulic drive systems controlled by the control unit and corresponding to each hydraulic cylinder; and
    each hydraulic drive system comprises:
      a digital amplifier connected to the control unit and usable for converting the motion parameter data transmitted from the control unit into an analog signal for output;
      a proportional reversing valve connected to the digital amplifier and usable for receiving analog signals to control the movement direction of hydraulic cylinder and hydraulic oil flow; and
      a displacement sensor provided on the hydraulic cylinder for detecting displacement information of a piston rod, and a signal output terminal of the displacement sensor is connected to a signal input terminal of the digital amplifier.

16. The partitioned lifting forming type selective laser melting workbench according to claim 12, wherein:
    the driving device is a hydraulic cylinder;
    the control system further comprises a group of hydraulic drive systems controlled by the control unit and corresponding to each hydraulic cylinder; and
    each hydraulic drive system comprises:
      a digital amplifier connected to the control unit and usable for converting the motion parameter data transmitted from the control unit into an analog signal for output;
      a proportional reversing valve connected to the digital amplifier and usable for receiving analog signals to control the movement direction of hydraulic cylinder and hydraulic oil flow; and
      a displacement sensor provided on the hydraulic cylinder for detecting displacement information of a piston rod, and a signal output terminal of the displacement sensor is connected to a signal input terminal of the digital amplifier.

17. The partitioned lifting forming type selective laser melting workbench according to claim 2, wherein:

the first powder supplying area and the first partitioned area to be subjected to powder-spreading form a one-to-one correspondence relationship; and the second powder supplying area and the second partitioned area to be subjected to powder-spreading form a one-to-one correspondence relationship.

18. The partitioned lifting forming type selective laser melting workbench according to claim 1, wherein the at least one forming outer abutment comprises three forming outer abutments, each forming outer abutment arranged to be lifted up and down independently from or together with each other forming inner abutment and the forming inner abutment.

19. The partitioned lifting forming type selective laser melting workbench according to claim 2, wherein:

the at least one forming outer abutment comprises three forming outer abutments, each forming outer abutment arranged to be lifted up and down independently from or together with each other forming inner abutment and the forming inner abutment; and the at least one powder supplying outer abutment comprises three powder supplying outer abutments, each powder supply outer abutment arranged to be lifted up and down independently from or together with each other powder supplying inner abutment and the powder supplying inner abutment.

20. The partitioned lifting forming type selective laser melting workbench according to claim 19, wherein each of the forming inner abutment and the powder supplying inner abutment is a solid cylindrical structure, and each forming outer abutment and each powder supplying outer abutment is a ring-shaped hollow structure corresponding to the cylinder shape of the forming inner abutment and the powder supplying inner abutment respectively, whereby the partitioned lifting forming type selective laser melting workbench is configured for forming ring-shaped parts.

* * * * *